(12) United States Patent
Harvey

(10) Patent No.: US 9,975,624 B1
(45) Date of Patent: May 22, 2018

(54) MULTICOPTER PROPELLER GUARD SYSTEM

(71) Applicant: Brandebury Tool Company, Inc., Gaithersburg, MD (US)

(72) Inventor: William B. Harvey, Laytonsville, MD (US)

( * ) Notice: Subject to any disclaimer, the term of this patent is extended or adjusted under 35 U.S.C. 154(b) by 175 days.

(21) Appl. No.: 15/175,289

(22) Filed: Jun. 7, 2016

Related U.S. Application Data

(60) Provisional application No. 62/172,965, filed on Jun. 9, 2015.

(51) Int. Cl.
*B64C 27/00* (2006.01)
*B64C 11/46* (2006.01)
*B64C 27/08* (2006.01)
*B64C 39/02* (2006.01)

(52) U.S. Cl.
CPC ............ *B64C 11/46* (2013.01); *B64C 27/006* (2013.01); *B64C 27/08* (2013.01); *B64C 39/024* (2013.01); *B64C 2201/108* (2013.01)

(58) Field of Classification Search
CPC ............ B64C 27/006; B64C 2201/088; B64C 2201/18; B64C 2025/325
See application file for complete search history.

(56) References Cited

U.S. PATENT DOCUMENTS

| 1,109,889 | A | * | 9/1914 | Whitcomb | B64C 27/006 244/17.15 |
| 2017/0043869 | A1 | * | 2/2017 | Howard | B64C 39/024 |
| 2017/0291697 | A1 | * | 10/2017 | Kornatowski | B64C 27/006 |

FOREIGN PATENT DOCUMENTS

| DE | 102005013391 A1 | * | 9/2006 | A63H 27/12 |
| WO | WO-2015072548 A1 | * | 5/2015 | B64C 37/00 |

* cited by examiner

*Primary Examiner* — Brian M O'Hara

(57) ABSTRACT

The embodiments relate to an apparatus for controlling the angular position of propeller guards of a multicopter. The apparatus includes a chassis having at least three sides, including first and second sides meeting at a first vertex and second and third sides meeting at a second vertex. Each side is in communication with at least one propeller. At least one guard is in communication with the chassis. Each guard corresponds to a respective side, and each guard has oppositely disposed first and second terminals. The apparatus further includes a rotation mechanism in communication with the at least one guard to control an angular position of at least one guard relative to the chassis. The angular position is controlled in real time to mitigate damage with regard to an approaching or potential obstacle.

18 Claims, 4 Drawing Sheets

MULTICOPTER PROPELLER GUARD SYSTEM

BACKGROUND

This application is a non-provisional patent application claiming the benefit of the filing data of U.S. patent application Ser. No. 62/172,965 filed on Jun. 9, 2015, and titled "Multicopter Propeller Guard System" which is hereby incorporated by reference.

The embodiments described herein relate to a propeller guard system for an aerial vehicle. More specifically, the embodiments relate to dynamically changing the angular position of the propeller guards.

An unmanned aerial vehicle (UAV), sometimes called an unmanned air-reconnaissance vehicle or a drone, is a non-piloted aircraft. UAVs are known in the art and can be operated via remote control or can be flown autonomously based on pre-programmed flight plans or more complex dynamic automation systems. UAVs have built-in electronics or devices, including but not limited to an accelerometer, gyroscope, GPS antennae, collision detection system, etc. in order to be flown autonomously and to gather real-time orientation and position information. This information is used to control the flight of the UAV. Besides being flown by hobbyists, UAVs are currently used in a number of military roles, including reconnaissance and attack. They are also in a small but growing number of civil roles, such as firefighting where a human observer would be at risk, police observation of civil disturbances, reconnaissance support in natural disasters, or any scenario in which direct human observation may be hazardous. Accordingly, UAVs are often used in dangerous missions to mitigate risk to human life.

One example of a UAV is a multicopter. A multicopter is an aerial vehicle that has two or more rotors, also known as propellers. Examples of multicopters include, but are not limited to, bicopters (i.e., two propellers), tricopters (i.e., three propellers), quadcopters (i.e., four propellers), hexacopters (i.e., six propellers), and octocopters (i.e., eight propellers). The motion of the multicopter is controlled by changing the relative speed of each propeller. Specifically, motion about the three symmetry axes of the multicopter, known as roll (i.e., rotation about the front-back axis), pitch (i.e., rotation about the side-side axis), and yaw (i.e., rotation about the vertical axis), can each be controlled by changing the relative speed of each propeller. For example, roll and pitch can be achieved by speeding up propellers on one side and slowing down the propellers on the other side, while yaw can be achieved speeding up propellers that are diagonally across from each other. Horizontal motion is achieved by causing the multicopter to lean towards the intended direction of travel, and vertical motion is achieved by simultaneously speeding up each propeller (i.e., ascent), or by simultaneously slowing down each propeller (i.e., descent).

SUMMARY

The aspects described herein comprise an apparatus to dynamically control the angular position of propeller guards of a multicopter.

According to one aspect, the apparatus is provided to dynamically control the angular position of propeller guards of a multicopter. The apparatus includes a chassis having an interior formed by at least three sides, including first, second, and third sides. The first and second sides meet at a first vertex and the second and third sides meet at a second vertex. Each side is in communication with at least one propeller. The apparatus further includes at least one guard in communication with the chassis. Each guard corresponds to a respective side, and each guard has oppositely disposed first and second terminals. The apparatus further includes at least two connectors in communication with the chassis, including first and second connectors positioned on the first side. The first and second connectors are positioned substantially adjacent to the first and second vertices, respectively. The first and second terminals are operatively coupled to the first and second connectors, respectively. The apparatus further includes a rotation mechanism in communication with at least one of the guards, the rotation mechanism to control an angular position of the at least one guard relative to the chassis. The angular position is controlled in a range relative to the chassis of approximately 180 degrees.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments unless otherwise explicitly indicated.

DETAILED DESCRIPTION

It will be readily understood that the components of the embodiments, as generally described and illustrated in the Figures herein, may be arranged and designed in a wide variety of different configurations. Thus, the following detailed description of the embodiments of the system and the method, as presented in the Figures, is not intended to limit the scope of the embodiments, as claimed, but is merely representative of the selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Figure 1:
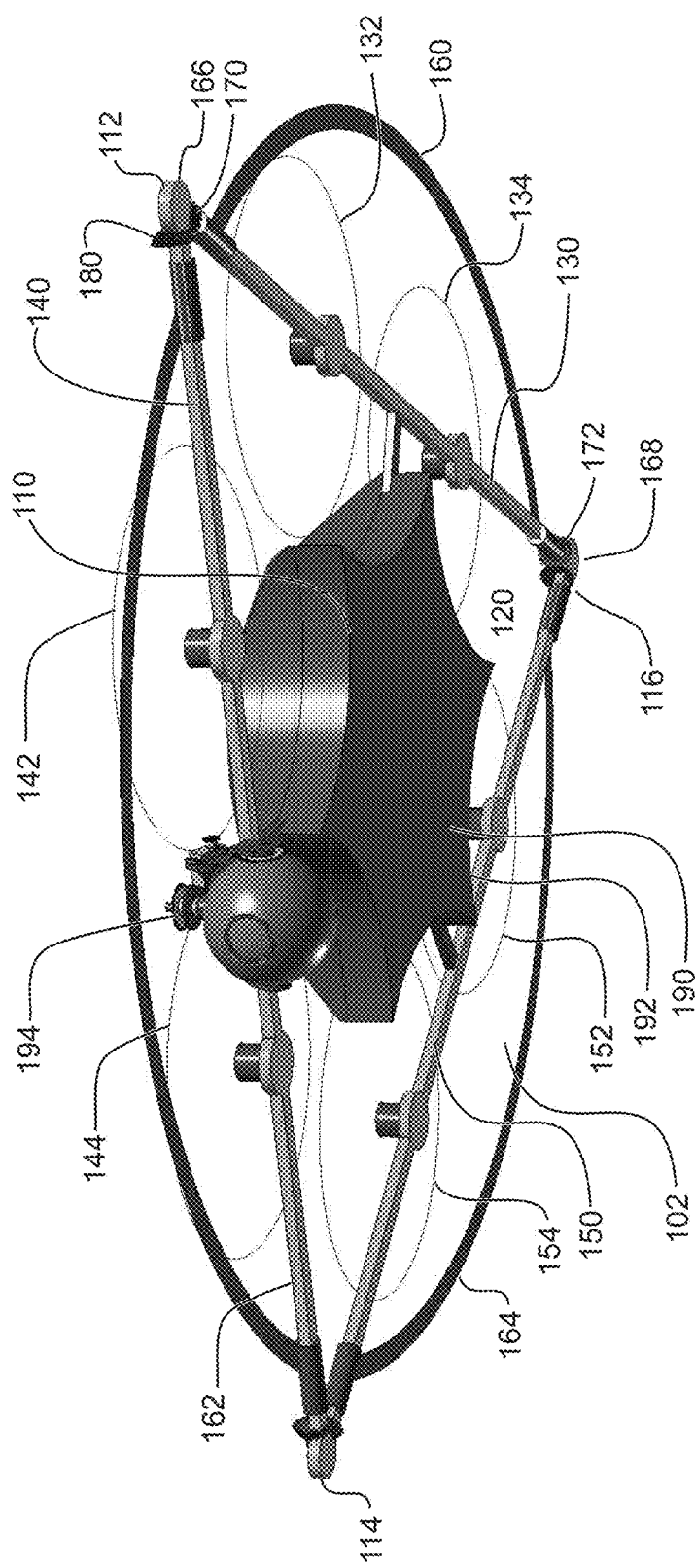
FIG. 1 depicts a perspective view of a multicopter in accordance with an embodiment.

With reference to FIG. 1, a perspective view (100) of an exemplary multicopter (102) is provided. The multicopter (102) includes a chassis (110). In one embodiment, the chassis (110) has an interior (120) formed by at least three sides. The interior (120) is formed by a first side (130), a second side (140), and a third side (150). As further shown, the first side (130) and the second side (140) meet at a first vertex (112), the second side (140) and the third side (150) meet at a second vertex (114), and the first side (130) and the third side (150) meet at a third vertex (116). In one embodiment, a payload may be operatively coupled to the multicopter. It is to be understood that the three-sided multicopter depicted in FIG. 1 is provided as a non-limiting example of a multicopter, and it is to be appreciated that the embodiments described below in conjunction with FIGS. 2 and 3 may be implemented with respect to any n-sided multicopter having three or more sides in accordance with the embodiments described herein.

Each side of the multicopter is in communication with at least one propeller. Referring to FIG. 1, a first side (130) is shown in communication with propellers (132) and (134), a second side (140) is shown in communication with propellers (142) and (144), and a third side (150) is shown in communication with propellers (152) and (154). In other words, the multicopter (102) depicted in FIG. 1 is a hexacopter. It is to be understood that the six-propeller multicopter depicted in FIG. 1 is provided as a non-limiting example of a multicopter, and it is to be appreciated that the embodiments described below in conjunction with FIGS. 2 and 3 may be implemented with respect to a multicopter having any suitable number of propellers, including but not limited to a quadcopter, a hexacopter, an octocopter, etc., in accordance with the embodiments described herein.

In order to shield and protect the propellers against damage caused by the multicopter crashing or colliding with objects, walls, the ground, etc., one or more propeller guards may be provided. In one embodiment, at least one propeller guard, hereinafter referred to as a guard, is in communication with the chassis with each guard corresponding to a respective side. Referring to FIG. 1, multicopter (102) includes a first guard (160) corresponding to the first side (130), a second guard (162) corresponding to second side (140), and third guard (164) corresponding to third side (150). In one embodiment, each guard has oppositely disposed first and second terminals. As shown, first guard (160) has first terminal (170) and second terminal (172). Although not shown, it is to be understood and appreciated that second and third guards (162) and (164), respectively, also have oppositely disposed terminals.

In one embodiment, the multicopter (102) is further provided with at least two connectors in communication with the chassis (110). As shown, first and second connectors (166) and (168) are positioned on the first side (130), such that the first connector (166) is positioned substantially adjacent to the first vertex (112) and the second connector (168) is positioned substantially adjacent to the second vertex (114). In one embodiment, the first and second terminals (170) and (172) are operatively coupled to the first and second connectors (166) and (168), respectively. Although not shown, it is to be understood and appreciated that the terminals of the second and third guards (162) and (164), respectively, may also be operatively coupled to respective connectors in communication with the chassis in a similar manner. In one embodiment, each guard is comprised of a flexible material, including but not limited to a carbon fiber material, such that the guard has a rest state and an active state. The rest state corresponds to the guard having a linear shape and the active state corresponds to the guard having a non-linear shape. The guard is in the active state in response to its terminals being operatively coupled to their respective connectors. In one embodiment, and as shown in FIG. 1, the non-linear shape of the first guard (160) is a semi-circle, although this non-linear shape should not be considered limiting. Accordingly, each guard is comprised of a material that is capable of being flexed and formed into a non-linear shape, such as a semi-circle, in order to be operatively coupled to its respective connectors.

Referring back to FIG. 1, the multicopter (102) is further provided with a rotation mechanism (180) in communication with the guards (160)-(164). The rotation mechanism (180) is configured to control an angular position of at least one of the guards relative to the chassis (110). In one embodiment, the angular position is controlled in a range of approximately 180 degrees, e.g., from substantially ninety degrees below the chassis to substantially ninety degrees above the chassis. Similarly, in one embodiment, the range of the guard(s) may be greater than 180 degrees. The components and operation of rotation mechanism (180) will be described in detail below with reference to FIG. 3.

Multicopter (102) is further provided with a housing (190). In one embodiment, the housing (190) is positioned substantially central to the interior (120), and has a size and shape for avoiding interference with the rotation of propellers (132) and (134), (142) and (144), and (152) and (154). Housing (190) is designed to house a built-in electronics system (192) that is used to control the flight of the multicopter (102). The components of electronics system (192) will be described in detail below with reference to FIG. 2. Housing (180) may optionally include a camera (194). In one embodiment, camera (194) is mounted on an exterior surface of the housing (190).

In one embodiment, the electronics system (192) provides for autonomous flight of the multicopter (102). For instance, a user may input a destination as a set of GPS coordinates, which allows the electronics system (192) to fly the multicopter to the destination by autonomously and individually controlling the propellers. In one embodiment, the electronics system (192) provides for manual flight of the multicopter (102) by use a remote control device (not shown) to generate signals to the electronics system (192). The remote control device may be, for example, a radio transmitter. Remote control devices such as radio transmitters are known by those skilled in the art, and no further description will be provided with respect to implementing manually controlled flight. While in flight, in one embodiment, the electronics system (192) may autonomously control the flight of the multicopter by receiving and gathering real-time motion information. The motion information includes, but is not limited to, orientation and position information.

In one embodiment, the electronics system (192) is in communication with the rotation mechanism (180) in order to autonomously control the angular position of the guard system in real-time. In one embodiment, the angular position of at least one guard is autonomously controlled by motion information detected by the electronics system (192). For example, in response to the electronics system (192) detecting a collision threat with respect to one or more of the propellers (132), (134), (142), (144), (152), or (154), the angular position of the one or more of guards (160)-(164) is controlled to protect their respective propellers from collision damage.

Besides detecting collision events, electronics system (192) may be configured to detect special flight events. Detection of these special flight events causes the rotation mechanism (180) to position the guards (160)-(164) each at the same angular position simultaneously. In one embodiment, in response to the electronics system (192) detecting a substantially vertical descent, the rotation mechanism (180) positions the guards (160)-(164) at a substantially ninety degree angle below the chassis (110). That is, the electronics system (192) interprets a substantially vertical descent as a potential landing event, and sends a signal to the rotation mechanism (180) to use the guards (160)-(164) as landing gear in such an event. Such a configuration obviates the need to install separate landing gear onto the multicopter, which contributes to substantial weight reduction of the multicopter. In one embodiment, in response to the electronics system (192) detecting a substantially vertical ascent, the rotation mechanism (180) positions the guards (160)-(164) at a substantially ninety degree angle above the chassis (110). That is, the electronics system (192) interprets a substantially vertical ascent as a dangerous event with respect to potential collisions above the multicopter, and sends a signal to the rotation mechanism (180) to use the guards (160)-(164) to protect the tops of the propellers (132), (134), (142), (144), (152), or (154) in such an event.

Figure 2:
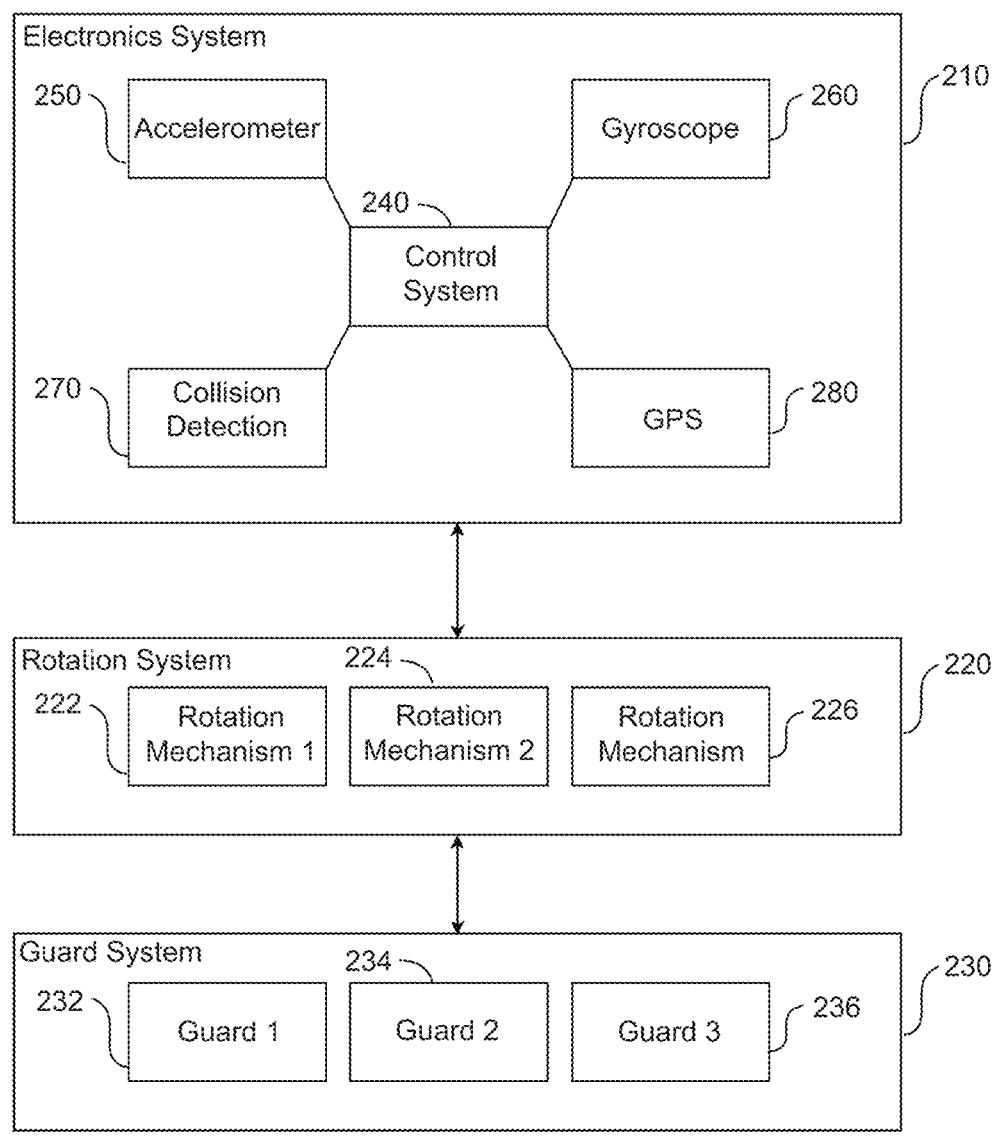
FIG. 2 depicts a block diagram of an electronics system for controlling a flight of the multicopter.

Referring now to FIG. 2, a block diagram (200) of an electronics system (210) for controlling the flight of a multicopter is provided. The electronics system (210) is in communication with a rotation system (220). In one embodiment, the rotation system (220) includes at least one rotation mechanism (222), and preferably three or more rotation mechanisms (222), (224), and (226). The rotation system (220) is shown in communication with the guard system (230). In one embodiment, the guard system (230) includes at least one guard (232), and the at least one rotation mechanism (222) is in communication with the at least one guard (232). It is to be understood and appreciated that the guard system (230) may include more than one guard (232), as shown herein with second and third guards (234) and (236), respectively. In one embodiment, the guard system (230) has a guard corresponding to a respective side of the multicopter, and the rotation system (220) has one rotation mechanism in communication with a respective guard of the guard system (230). Accordingly, the embodiment depicted in FIG. 2 is not intended to be limiting.

As shown, the electronics system includes a multitude of components, including but not limited to a control system (240), an accelerometer (250), a gyroscope (260), a collision detection system (270), and a global positioning satellite (GPS) receiver (280). In one embodiment, control system (240) gathers motion data measured by the components (250)-(280), and communicates with the rotation mechanism (220) in order to autonomously control an angular position of at least one guard of the guard system (230) in response to the detection of certain motion events.

The accelerometer (250) is known in the art as a device that measures proper acceleration (i.e., acceleration relative to free-fall), as opposed to coordinate acceleration. In other words, the accelerometer (250) measures g-forces. The gyroscope (260) is known in art the art as a device used to measure or maintain orientation by exploiting the conservation of angular momentum. Motion data measured by the accelerometer (250) and/or gyroscope (260) is gathered by the control system (240). In one embodiment, the control system (240) communicates with the rotation mechanism (220) to simultaneously raise or lower each guard of the guard system (230) to a substantially 90 degree angular position above or below the chassis of the multicopter, respectively, in response to detection of a substantially vertical ascent or a substantially vertical descent, respectively, in accordance with the embodiments described in FIG. 1. The electronics system (210) is configured to recognize vertical motion events. Accordingly, the electronics system (210) autonomously and dynamically, e.g. in real-time, controls the angular position of at least one guard in order to protect one or more propellers from colliding with an object above or below the multicopter (e.g., the ceiling, ground etc.).

The collision detection system (270) may be any collision detection system that is configured to detect collision threats. One skilled in the art would know how to implement such a collision detection system, and no further description of the collision detection system will be provided. Motion data measured by the collision detection system (240) is gathered by the controller (260). In one embodiment, the controller (260) communicates with the rotation mechanism (270) to autonomously control the angular position of at least one guard of the guard system (280) in response to detection of a collision threat in accordance with the embodiments described in FIG. 1. Accordingly, the electronics system (210) is configured to detect at least a possibility of collision with an object during flight, and the electronics system (210) autonomously controls the angular position of at least one guard in order to protect one or more propellers from colliding with the object.

The GPS receiver (280) is known in the art as a device used to receive GPS signals in order to obtain GPS coordinates and/or to determine the location of the GPS receiver (280). The GPS receiver (280) includes a GPS antenna to receive the signals. In one embodiment, GPS coordinates are used to program a flight destination for autonomous flight control of the multicopter in accordance with the embodiments described above with reference to FIG. 1. One skilled in the art would know how to implement GPS coordinates to program a destination for autonomous flight control.

Figure 3:
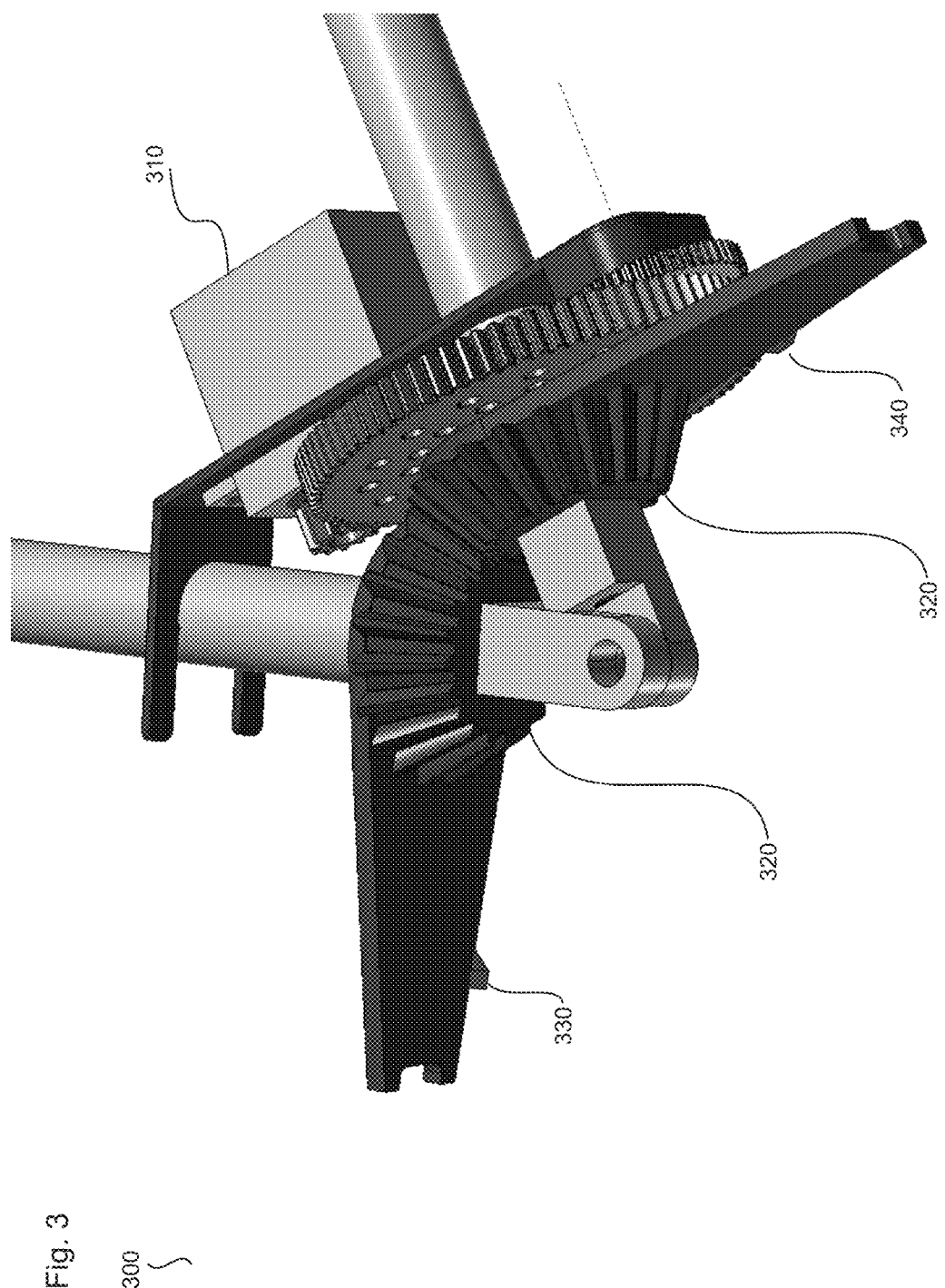
FIG. 3 depicts a perspective view of an exemplary rotation mechanism.

With reference to FIG. 3, a perspective view (300) of an exemplary rotation mechanism (310) is provided. The rotation mechanism (310) includes a servomechanism (320), hereinafter referred to as a servo (320). The servo (320) is known in the art as a device that uses negative feedback to autonomously correct the performance of a mechanism. In particular, a servo uses feedback or error-correction signals to control the mechanical position, velocity, acceleration, etc. of a mechanical system. In one embodiment, the servo (320) is a servomotor. A servomotor is a rotary actuator that allows for control of angular position, velocity, and acceleration.

In one embodiment, at least one guard of the multicopter is associated with a respective rotation mechanism, and the angular position of each guard is independently controllable by a servo of the respective rotation mechanism. For example, servo (310) is in communication with an electronics system to receive signals for controlling the angular position of a guard of the multicopter, in accordance with the embodiments described above with respect to FIGS. 1 and 2. In one embodiment, an alternative tool may replace the servo (310), while continuing to support the functionality of the servo (310) with regard to controlling a position of one associated guard.

The rotation mechanism (320) further includes stop blocks (330) and (340). The stop blocks (330) and (340) allow for a predetermined total range of motion of the guards. In one embodiment, the stop blocks (330) and (340) allow for a total range of motion relative to the chassis of approximately 180 degrees, including approximately 90 degrees below the chassis and approximately 90 degrees above the chassis. Other aspects and components of rotation mechanism (320) not described herein may be included or added to the rotation mechanism (320) in accordance with the embodiments described herein, as would be known by one skilled in the art (e.g., gears, screws, electronics, etc.).

Accordingly, it is to be understood and appreciated that the structure of rotation mechanism (320) is not to be limited to the components described above herein, such as servo (310) and stop blocks (330) and (340).

Figure 4:
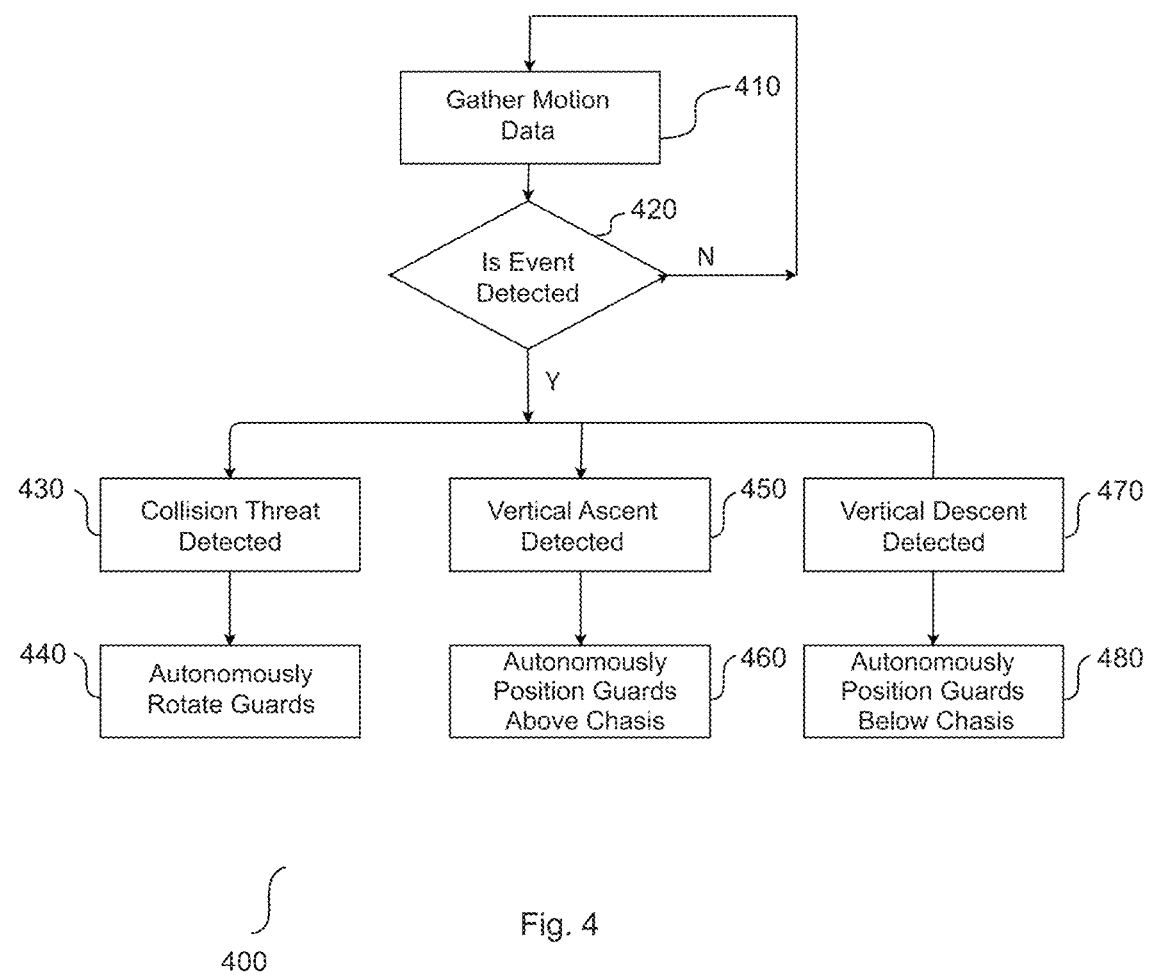
FIG. 4 depicts a flowchart illustrating a method to dynamically control an angular position of at least one propeller guard of a multicopter while in flight.

With reference to FIG. 4, a flowchart (400) is provided depicting a method to dynamically control an angular position of at least one propeller guard of a multicopter while in flight. Motion data is gathered (410). In one embodiment, the motion data is gathered by an electronics system of the multicopter, such as the electronics system described above with reference to FIGS. 1 and 2. The motion data may include, but is not limited to, collision detection data, vertical ascent data, vertical descent data, and GPS coordinate data. In one embodiment, the motion data is gathered in real-time.

It is then determined if an event is detected based on the gathered data (420). Such events include a collision threat, a substantially vertical ascent, and a substantially vertical descent. The detection of an event causes an angular position of at least one of the guards to be autonomously controlled. In one embodiment, the angular position is dynamically controlled in real-time. The particular event detected in step (420) is what determines how the angular position of the at least one guard is autonomously controlled.

If the particular event detected is a collision threat (430), the angular position of at least one guard is autonomously rotated to protect at least one of the propellers (440) from collision with a secondary surface or object. Specifically, a real-time response is provided to detected collision threats, and a position of one or more guards is dynamically changed to protect the propellers that are threatened. Such collision threats may include, but are not limited to, walls, trees, other flying objects, etc. In one embodiment, a collision detection system of the electronics system detects collision threats. Details of the collision detection system have been discussed above with respect to FIGS. 1 and 2.

The collision detection system may not be able to detect collision threats with respect to areas directly above or below the multicopter. To address this issue, the detection of particular flight events may cause the positioning of the guards to be autonomously controlled absent a detected collision threat. For example, in response to the detection of a substantially vertical ascent (450), each guard is autonomously positioned above the chassis (460). In one embodiment, the rotation range may be up to 90 degrees or more. In other words, a substantially vertical ascent is interpreted as a dangerous event with respect to a potential collision above the multicopter. In response to the detection of a substantially vertical descent (470), each guard is autonomously positioned below the chassis (480). In one embodiment, the rotation range may be up to 90 degrees or more with the rotation for the vertical descent in a direction opposite from the rotation for the vertical ascent. In other words, a substantially vertical descent is interpreted as a potential landing event, and each of the guards is rotated and positioned to act as landing gear to protect the chassis from direct contact with an obstacle, e.g. the ground. In one embodiment, the positioning of each guard in response to the detection of a substantially vertical ascent or a substantially vertical descent is simultaneous or near simultaneous.

Accordingly, the detection of particular events during the flight of the multicopter, such as detected collision threats or vertical motion events, causes the dynamic and autonomous control of an angular position of at least one guard of a multicopter to protect at least one propeller from either a detected or possible collision threat.

The flowchart(s) and block diagram(s) in the Figures illustrate the architecture, functionality, and operation of possible implementations of systems, methods, and computer program products according to various embodiments of the present invention. In this regard, each block in the flowchart or block diagram may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments provided herein has been presented for purposes of illustration and description, but is not intended to be exhaustive or limited to the invention in the form disclosed. Many modifications and variations will be apparent to those of ordinary skill in the art without departing from the scope and spirit of the embodiments. The embodiments were chosen and described in order to best explain the principles of the embodiments and the practical application, and to enable others of ordinary skill in the art to understand the various embodiments with various modifications as are suited to the particular use contemplated. In particular, the embodiments were chosen and described in order to enable one skilled in the art to dynamically change the angular position of propeller guards of a multicopter.

It will be appreciated that, although specific embodiments have been described herein for purposes of illustration, various modifications may be made without departing from the spirit and scope of the embodiments. In particular, the multicopter may be configured with an alternate design to the chassis, such as a configuration with spokes. This configuration includes a primary vertex formed at a meeting point of the spokes. In addition, each spoke is in communication with a connector, and there is a minimum of three connectors. The first and second connectors meet at a first secondary vertex, the second and third connectors meet at a second secondary vertex, and the first and third connectors meet at a third secondary vertex, and each connector is in communication with at least one propeller. A guard is provided in communication with each connector. Each guard has oppositely disposed first and second terminals. A rotation mechanism is provided in communication with the guard, with the rotation mechanism controlling an angular position of the guard relative to the primary vertex, with the angular position controlled in a range relative to the vertex of approximately one hundred eighty degrees. Accordingly, the scope of protection of this invention is limited only by the following claims and their equivalents.

What is claimed is:

1. An aerial vehicle comprising:
    a chassis having an interior formed by at least three sides, including first, second, and third sides, wherein the first and second sides meet at a first vertex, the second and third sides meet at a second vertex, and the first and third sides meet at a third vertex;
    at least one propeller mounted on each side;
    at least one guard in communication with the chassis, wherein each guard corresponds to a respective side, and wherein each guard has oppositely disposed first and second terminals;
    at least two connectors in communication with the chassis, including first and second connectors positioned on the first side, wherein the first and second connectors are positioned substantially adjacent to the first and second vertices, respectively, and wherein the first and second terminals are operatively coupled to the first and second connectors, respectively; and
    a rotation mechanism in communication with the at least one guard to control an angular position of at least one guard relative to the chassis, wherein the angular position is controllable over a range relative to the chassis of approximately one hundred eighty degrees.

2. The apparatus of claim 1, wherein each guard is comprised of a flexible material, the guard having a rest state and an active state, wherein the rest state corresponds to the guard having a linear shape and the active state corresponds to the guard having a non-linear shape, and wherein the guard is in the active state in response to the first and second terminals being operatively coupled to the first and second connectors.

3. The apparatus of claim 2, wherein the guard is comprised of a carbon fiber material.

4. The apparatus of claim 2, wherein the non-linear shape is a semi-circle.

5. The apparatus of claim 1, further comprising a housing positioned substantially central to the interior of the chassis, the housing having a size and shape for avoiding interference with rotation of the at least one propeller.

6. The apparatus of claim 5, wherein the housing comprises an electronics system including an accelerometer, a gyroscope, a collision detection system, and a global positioning satellite (GPS) antenna.

7. The apparatus of claim 6, wherein the housing further comprises a camera.

8. The apparatus of claim 7, wherein the camera is mounted on an exterior of the housing.

9. The apparatus of claim 6, further comprising the angular position of the at least one guard being autonomously controllable by motion information detected by the electronics system.

10. The apparatus of claim 9, wherein the angular position of the at least one guard is dynamically controllable to protect at least one propeller in communication with the corresponding side in response to detection of a collision threat.

11. The apparatus of claim 9 wherein each guard has a position of substantially zero degrees relative to the chassis in response to the electronics system detecting no motion.

12. The apparatus of claim 9, further comprising at least three guards in communication with the chassis, wherein each guard corresponds to a respective side.

13. The apparatus of claim 12 wherein each guard has a position of substantially ninety degrees below the chassis in response to the electronics system detecting a substantially vertical descent.

14. The apparatus of claim 13, further comprising each guard having dual functionality, with the position for the detected descent being a landing gear function.

15. The apparatus of claim 12 wherein each guard has a position of substantially ninety degrees above the chassis in response to the electronics system detecting a substantially vertical ascent.

16. The apparatus of claim 1 wherein the angular position of the at least one guard is manually controllable by a signal generated by a remote control device.

17. The apparatus of claim 1 further comprising a controller capable of providing real-time control of at least one guard.

18. An aerial vehicle comprising:
    a chassis having an interior formed by at least three mounting arms including first, second, and third mounting arm, wherein the first and second mounting arms meet at a first vertex the second and third mounting arms meet at a second vertex;
    at least one propeller mounted on each mounting arm;
    at least one guard in communication with the chassis, wherein each guard corresponds to a respective mounting arm, and wherein each guard has oppositely disposed first and second terminals;
    at least two connectors in communication with the chassis, including first and second connectors positioned on the first mounting arm, wherein the first and second connectors are positioned substantially adjacent to the first and second vertices, respectively, and wherein the first and second terminals are operatively coupled to the first and second connectors, respectively; and
    a rotation mechanism in communication with the at least one guard to control an angular position of at least one guard relative to the chassis, wherein the angular position is controllable over a range relative to the chassis of approximately one hundred eighty degrees.

* * * * *